United States Patent [19]

Boudault et al.

[11] 4,323,862

[45] Apr. 6, 1982

[54] FREQUENCY SHIFT MODULATOR WITH CIRCUITRY FOR SIMPLE CHANGE-OVER BETWEEN HIGH AND LOW CHANNELS

[75] Inventors: Robert Boudault, Limours; Gérard Pouzoullic, Gif Zur Yvette, both of France

[73] Assignee: U.S. Philips Corporation, New York, N.Y.

[21] Appl. No.: 138,064

[22] Filed: Apr. 7, 1980

[30] Foreign Application Priority Data

Apr. 6, 1979 [FR] France ................................ 79 08725

[51] Int. Cl.³ .......................... H03C 3/02; H03K 7/06
[52] U.S. Cl. .................................... 332/9 R; 331/179; 332/16 R; 375/62
[58] Field of Search .................. 332/9 R, 9 T, 16 R, 332/16 T; 375/62, 65; 331/179

[56] References Cited

U.S. PATENT DOCUMENTS 3,835,419 9/1974 Milne et al. ..................... 332/16 R
3,914,694 10/1975 Shawhan ....................... 332/16 R X
4,039,952 8/1977 Huntley ................................ 375/62

Primary Examiner—Siegfried H. Grimm
Assistant Examiner—Edward P. Westin
Attorney, Agent, or Firm—James J. Cannon, Jr.

[57] ABSTRACT

The frequency shift modulator comprises an operational amplifier connected so as to form an integrating circuit and followed by a bistable circuit having trigger hysteresis for producing a two-level voltage which is applied to one end of a first resistor whose other end is coupled to an input of the operational amplifier. Logic means are provided for applying a voltage equal or complementary to the said two-level voltage, depending upon the level of the data signal, to one end of a second resistor whose other end is joined with the said other end of the first resistor. Further logic means are provided for applying a voltage equal or complementary to the said two-level voltage, depending on whether the desired modulated signal has either the one or the other central frequency, to one end of a third resistor whose other end is joined with the joined ends of the first and second resistors. Finally, a common resistor is connected between the joined ends of the three above-mentioned resistors and the input of the operational amplifier.

4 Claims, 4 Drawing Figures

FREQUENCY SHIFT MODULATOR WITH CIRCUITRY FOR SIMPLE CHANGE-OVER BETWEEN HIGH AND LOW CHANNELS

BACKGROUND OF THE INVENTION

The invention relates to a modulator for data transmission by frequency shift modulation comprising a first operational amplifier and an associated capacitor connected so as to form an integrating circuit, a bistable circuit having trigger hysteresis connected to the output of the first operational amplifier for producing a two-level voltage, a first resistor having one end connected to the output of the bistable circuit and the other end coupled to an input of the first operational amplifier so as to produce a triangular voltage at the output of the first operational amplifier, first logic means for applying a voltage equal or complementary to said two-level voltage, depending upon the value of the data signal, to one end of a second resistor whose other end is joined with said other end of the first resistor.

A modulator of this type may, for example, be used to implement 200-baud modems standardized by the CCITT. These modems comprise a modulator to transmit data over a "high" channel by using the frequencies $F_1 = 1750$ Hz $+ 100$ Hz and $F_2 = 1750$ Hz $- 100$ Hz, and a modulator to transmit data over a "low" channel by using the frequencies $F'_1 = 1080$ Hz $+ 100$ Hz and $F'_2 = 1080$ Hz $- 100$ Hz. The frequencies $F_o = 1750$ Hz and $F'_o = 1080$ Hz are called hereinafter the central frequencies of the high and the low channels.

U.S. Pat. No. 4,039,952 describes a modulator of the type set forth in the preamble by means of which it is possible to obtain a triangular-shaped or sawtooth signal whose frequency is shifted as a function of the data. However, this U.S. patent does not contemplate the case of a standardized 200-baud modem for data transmission over two channels with the same frequency shift around two different central frequencies. The ideal modulator would then be a universal modulator by means of which it is possible to pass from a "high"-channel modulator to a "low"-channel modulator and vice versa by means of a very simple change-over.

SUMMARY OF THE INVENTION

The present invention has for its object to provide such a universal modulator, which does not require complicated adjustments during manufacture and which allows, by means of a simple change-over, the generation of either a signal modulated with a given frequency shift around one central frequency or another signal modulated with the same frequency shift around another central frequency. Another object of the invention is to provide means to obtain a very high stability of the different frequencies supplied by the modulator in face of the supply voltage and the temperature.

According to the invention, the modulator of the type set forth in the preamble is characterized in that for generating a first or a second frequency shift modulated signal having different central frequencies and being modulated with the same frequency shift the modulator comprises second logic means for applying a voltage equal or complementary to said two-level voltage, depending on whether the desired modulated signal is said first or said second frequency shift modulated signal, to one end of a third resistor whose other end is joined with the joined ends of the first and second resistors, and a common resistor connected between the joined ends of the first, second and third resistors and the input of the first operational amplifier.

BRIEF DESCRIPTION OF THE DRAWINGS

An embodiment of the invention will now be described, by way of example, with reference to the accompanying drawings in which.

DESCRIPTION OF THE PREFERRED EMBODIMENT

Figure 1:
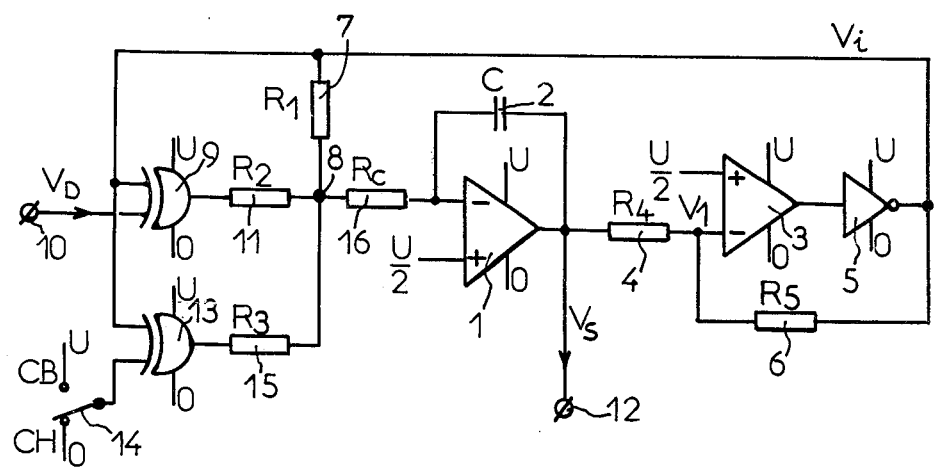
FIG. 1 shows a circuit diagram of the modulator according to the invention.

The modulator shown in FIG. 1 comprises an integrating circuit formed by an operational amplifier 1, a capacitor 2 of capacitance value C connected between the inverting input and the output of the amplifier 1 and, finally, a resistor network connected to the inverting input, which network will be described hereinafter. The operational amplifier 1 is fed by a voltage source U and its non-inverting input is connected to a reference potential ($U/2$).

The output of the operational amplifier 1 is coupled by way of a resistor 4 of resistance value $R_4$ to the inverting input of an operational amplifier 3 forming a comparator. This comparator 3 is also fed by the voltage source U and its non-inverting input is connected to the reference potential ($U/2$).

The output of the comparator 3 is connected to an inverter 5 which is also fed by the voltage source U. Its output is connected to the inverting input of the comparator 3 by way of a resistor 6 of resistance value $R_5$. At the output of the inverter 5, a two-level voltage $V_i$ is obtained which changes from the value O to the value U when the voltage $V_1$ at the inverting input of the comparator 3 becomes slightly higher than the voltage ($U/2$) and which changes from the value U to the value O when the voltage $V_1$ becomes slightly lower than the voltage ($U/2$). This trigger action is produced with a certain hysteresis owing to the fact that when the output voltage $V_i$ of the inverter 5 changes from O to U, the voltage $V_1$ at the inverting input of the comparator 3 increases suddenly from the value ($U/2$) to a value much higher than ($U/2$) and when the output voltage $V_i$ changes from U to O, the voltage $V_1$ decreases suddenly from the value ($U/2$) to a value much lower than ($U/2$). This mode of operation is similar to that of the circuit known as Schmitt trigger.

The two-level voltage $V_i$ is applied to one end of a resistor 7 of resistance value $R_1$, whose other end 8 is coupled to the inverting input of the operational amplifier 1.

The two-level voltage $V_i$ is also applied to one input of an Exclusive-OR circuit 9, whose other input receives the data signal to be transmitted in the form of a binary signal $V_D$ appearing at a terminal 10 and having the levels O and U. At the output of the Exclusive-OR circuit 9, a voltage equal to the two-level voltage $V_i$ is obtained when the binary data signal has the level O and a voltage $\overline{V_i}$ complementary to this voltage $V_i$ when the binary data signal has the level U. The voltage $V_i$ or $\overline{V_i}$ obtained at the output of the Exclusive-OR circuit 9 is applied to one end of a resistor 11 of resistance value $R_2$ whose other end is connected to the end 8 of the resistor 7. According to the prior art described in the U.S. Pat. No. 4,039,952, the junction 8 of resistors 7 and 11 is directly connected to the inverting input of the operational amplifier 1. In this way, the terminal 12 connected to the output of the operational amplifier 1 outputs a voltage $V_S$ of a triangular or sawtooth shape whose frequency may have two values depending upon the level of the binary data signal applied to the terminal 10. The arrangement described so far is therefore suitable for use as a frequency shift modulator. For instance, for the standardized 200-baud modem two different arrangements must be used when employing this prior art technique, each arrangement being adjusted so as to realize either the "high"-channel modulator or the "low"-channel modulator.

In contrast therewith, the present invention renders it possible to implement a universal modulator which, during use, can be assigned to either the "high"-channel or the "low"-channel with the aid of a very simple change-over by means of a detachable wire ("strap") or a change-over circuit. Furthermore, the present invention mitigates the drawbacks of this prior art modulator as regards the frequency stability.

In order to realize a universal modulator according to the present invention, an Exclusive-OR circuit 13 is used, one input of which receives the two-level voltage $V_i$ and the other input of which receives by way of a change-over switch 14 the voltage O, when this switch is in the position CH and the voltage U, when this switch is in the position CB. Depending upon the position of the change-over switch 14, there appears at the output of the Exclusive-OR circuit 13 the voltage $V_i$ or $\overline{V_i}$ which is applied to one end of a resistor 15 of resistance value $R_3$, the other end of which is connected to the junction 8 of resistors 7 and 11. Furthermore, as will be described hereinafter, the stability of the frequencies versus the temperature is improved by arranging a resistor 16 of resistance value $R_C$ between the junction 8 of the resistors 7, 11 and 15 and the inverting input of the operational amplifier 1.

The following description explains in detail how it is possible to determine the values of the various elements of the arrangement, i.e. capacitance C, resistances $R_1$ to $R_5$ and $R_C$, to obtain either the "high"-channel signal modulated by the data or the "low"-channel signal modulated by the data, depending upon the position of the change-over switch 14.

The other measures taken to improve the frequency stability are as follows. All the circuits used are implemented in CMOS technology. It is a known fact that the output resistance of the circuits implemented in this CMOS technology is low. Hence, the inevitable fluctuations of the output resistances of the inverter 5 and the Exclusive-OR circuits 9 and 13 due to temperature variations may be neglected with respect to the resistors connected to their output. The inverter 5 and the Exclusive-OR circuits 9 and 13 implemented in CMOS technology behave as near-perfect change-over switches which have substantially no voltage loss and which, as a function of the signals applied to their input, therefore supply substantially either the voltage O or the supply voltage U. Finally, it will be seen that in the arrangement of the universal modulator shown in FIG. 1 the circuits are fed with one sole voltage U; the reference voltage (U/2) applied to the non-inverting inputs of the operational amplifier can be obtained from a voltage divider so that the universal modulator according to the invention requires only one supply source which, in addition to the advantage of simplicity, contributes to the stability of the frequencies with respect to the supply voltage.

For a better understanding of the detailed operation of the modulator shown in FIG. 1, the operation of the basic oscillator used in this modulator will now be further explained. This basic oscillator shown in FIG. 2 comprises some elements corresponding to those in FIG. 1 and having the same reference numerals: operational amplifier 1 provided with capacitor 2 and comparator 3 together with inverter 5 provided with resistors 4 and 6. In this basic oscillator, the two-level voltage $V_i$ obtained at the output of the inverter 5 is applied to one end of a single resistor 17 of resistance value R, the other end of which is connected to the inverting input of the operational amplifier 1.

Figure 3:
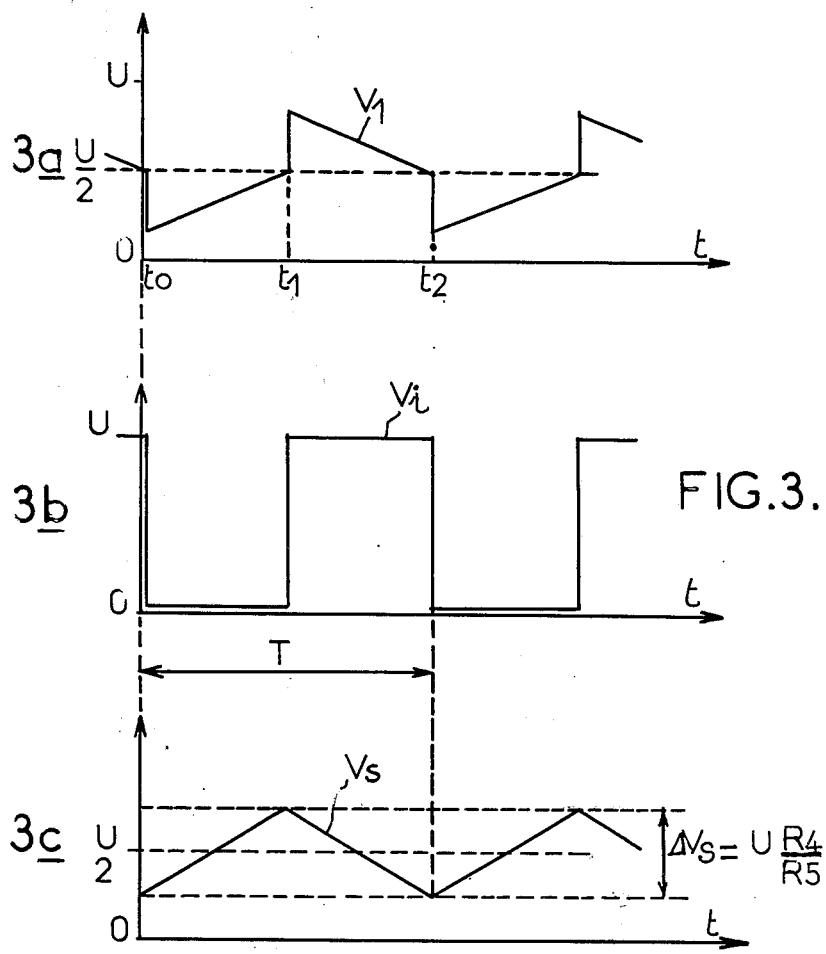
FIG. 3 shows a series of waveforms of the signals in various portions of the oscillator of FIG. 2, diagram 3a representing the voltage at the input of the bistable circuit having trigger hysteresis, diagram 3b representing a two-level voltage at the output of this bistable circuit and diagram 3c representing the sawtooth-shaped voltage at the output of the integrating circuit.

The operation of the basic oscillator is illustrated by the diagrams of FIG. 3. Diagram 3a shows the voltage $V_1$ at the inverting input of the comparator 3. Diagram 3b shows the two-level voltage $V_i$ at the output of the inverter 5 and diagram 3c shows the output voltage $V_S$ of the oscillator, taken from the output of the operational amplifier 1. The starting point of this explanation is the instant just prior to the instant $t_0$ at which the descending voltage $V_1$ reaches the voltage (U/2) applied to the non-inverting input of the comparator 3. The voltage $V_i$ then has the value U. The current in the resistor 6 then has the value $(U-U/2) \cdot (1/R_5) = (U/2R_5)$. As the current in the resistor 4 is the same as the current in the resistor 6, it follows that the output voltage $V_s$ has the value $V_{Sm}$ so that:

$$V_{Sm} = \frac{U}{2}\left(1 - \frac{R_4}{R_5}\right)$$

At the instant $t_0$, the comparator 3 changes state, the inverter 5 supplies the voltage $V_i = O$ and the voltage $V_1$ decreases suddenly to a value which is lower than (U/2) depending upon the ratio ($R_4/R_5$). As the voltage at the non-inverting input of the operational amplifier 1, whose gain is assumed to be infinite, is equal to (U/2), the current in the resistor 17 has the value (U/2R) and flows in the direction indicated by the solid arrow. Consequently, the output voltage $V_s$ increases linearly with a slope (U/2RC).

The voltage $V_1$ increases also linearly and it can be easily seen that just prior to the instant $t_1$ at which it attains the reference voltage (U/2) applied to the non-inverting input of the comparator 3, the output voltage $V_S$ attains the value $V_{SM}$ so that:

$$V_{SM} = \frac{U}{2}\left(1 + \frac{R_4}{R_5}\right)$$

At the instant $t_1$, the comparator 3 changes state, the inverter 5 produces the voltage $V_i = U$ and the voltage $V_1$ increases suddenly to a value which is higher than (U/2). The current in the resistor 17 then reverses its direction and flows in the direction indicated by the dotted arrow, whilst still maintaining the amplitude (U/2R). The output voltage $V_S$ decreases linearly with a slope $-(U/2RC)$.

At the instant $t_2$, the circuit operates in the same manner as explained for the instant $t_0$.

For the sake of simplicity, the frequency $F=(1/T)$ of the output voltage $V_S$ of the modulator will hereinafter be expressed as a function of the amplitude i of the current flowing through the resistor R for charging or discharging the capacitor C. When the absolute value of the slope of the output voltage $V_S$ is denoted as p, it is possible to write $p=(i/C)$. On the other hand, when the peak-peak amplitude of the output voltage $V_S$ is denoted as $\Delta V_S$ it will be easy to see on the basis of diagram 3c that $$p = \frac{\Delta V_S}{T/2}$$

where $\Delta V_S = V_{SM} - V_{Sm} = U \cdot (R_4/R_5)$.
From this it can be derived that:

$$F = i \cdot (1/U) \cdot (1/2C) \cdot (R_4/R_5). \tag{1}$$

Figure 2:
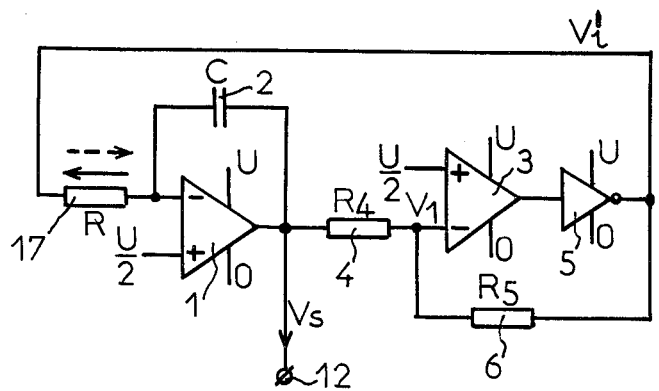
FIG. 2 shows a circuit diagram of the basic oscillator used in the modulator according to the invention.

For the basic arrangement of FIG. 2, $i=(U)/(2R)$ as described above, so that:

$$F = (1)/(4RC) \cdot (R_5/R_4) \tag{2}$$

The above formula (1) can be applied to the modulator shown in FIG. 1, i being the amplitude of the current through the common resistor $R_c$ for charging or discharging the capacitor C. This value i must be determined in all circumstances as a function of the level of the data signal $V_D$ and as a function of the position of the change-over switch 14.

Figure 4:
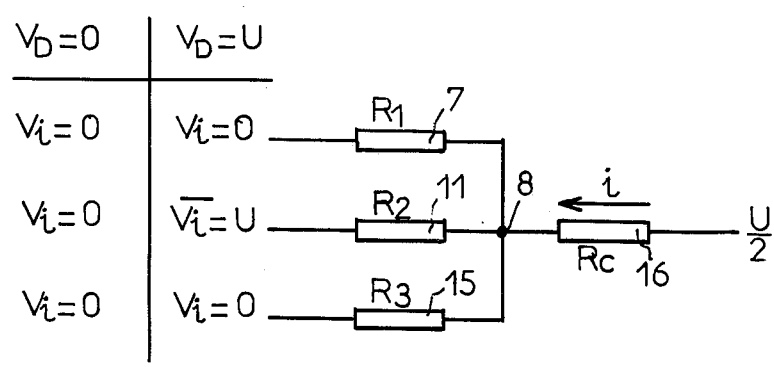
FIG. 4 shows the resistor network connected to the input of the integrating circuit in the modulator of FIG. 1 and the voltages applied to this network.

If it is assumed that the change-over switch 14 is in the position CH in order to obtain the two frequencies $F_1$ and $F_2$ of the "high" channel as a function of the data signal $V_D$, the current i can be easily obtained from an examination of the circuit diagram of FIG. 4, which shows the resistance network 7, 11, 15, 16 interconnected as shown in FIG. 1. One end of the resistor 16 through which the current i flows has always a voltage which is substantially equal to U/2 when the gain of the operational amplifier 1 is assumed to be infinite. Those ends of the resistors 7, 11, 15 which are not connected to the resistor 16 follow the values of the two-level voltage $V_i$ when the voltage $V_D$ corresponding to the data signal is such that $V_D=O$, and follow the values of the voltage $V_i$, $\overline{V_i}$, $V_i$ respectively, when the voltage $V_D=U$. For instance, in the case of $V_i=O$, which corresponds to an increasing output voltage $V_S$, the values indicated in FIG. 4 for $V_D=O$ and $V_D=U$, respectively, are obtained at the above-mentioned ends of the resistors 7, 11, 15.

Customary calculation shows that the amplitude of the current i which flows through the resistor 16 of resistance value $R_c$ takes for $V_D=O$ and $V_D=U$, respectively, the values $i_1$ and $i_2$ so that:

$$i_1 = \frac{U}{2} \cdot \frac{\frac{1}{R_1} + \frac{1}{R_2} + \frac{1}{R_3}}{1 + R_c\left(\frac{1}{R_1} + \frac{1}{R_2} + \frac{1}{R_3}\right)}$$

$$i_2 = \frac{U}{2} \cdot \frac{\frac{1}{R_1} - \frac{1}{R_2} + \frac{1}{R_3}}{1 + R_c\left(\frac{1}{R_1} + \frac{1}{R_2} + \frac{1}{R_3}\right)}$$

When these values are $i_1$ and $i_2$ are inserted in the formula (1), the two frequencies $F_1$ and $F_2$ for the "high"-channel as produced by the modulator of FIG. 1 are obtained:

$$\left. \begin{array}{l} F_1 = \frac{1}{4C} \cdot \frac{R_5}{R_4} \cdot \dfrac{\frac{1}{R_1} + \frac{1}{R_2} + \frac{1}{R_3}}{1 + R_c\left(\frac{1}{R_1} + \frac{1}{R_2} + \frac{1}{R_3}\right)} \\ \\ F_2 = \frac{1}{4C} \cdot \frac{R_5}{R_4} \cdot \dfrac{\frac{1}{R_1} - \frac{1}{R_2} + \frac{1}{R_3}}{1 + R_c\left(\frac{1}{R_1} + \frac{1}{R_2} + \frac{1}{R_3}\right)} \end{array} \right\} \tag{3}$$

To obtain the two frequencies $F'_1$ and $F'_2$ for the "low"-channel as a function of the data signal $V_D$, the change-over switch 14 is set to the position CB. In the same manner as above it is possible to show that these two frequencies are given by the formulae:

$$\left. \begin{array}{l} F'_1 = \frac{1}{4C} \cdot \frac{R_5}{R_4} \cdot \dfrac{\frac{1}{R_1} + \frac{1}{R_2} - \frac{1}{R_3}}{1 + R_c\left(\frac{1}{R_1} + \frac{1}{R_2} + \frac{1}{R_3}\right)} \\ \\ F'_2 = \frac{1}{4C} \cdot \frac{R_5}{R_4} \cdot \dfrac{\frac{1}{R_1} - \frac{1}{R_2} - \frac{1}{R_3}}{1 + R_c\left(\frac{1}{R_1} + \frac{1}{R_2} + \frac{1}{R_3}\right)} \end{array} \right\} \tag{4}$$

It will be seen that the frequencies $F_1$, $F_2$, $F'_1$, $F'_2$ are independent of the supply voltage U of the modulator. Between these four frequencies there is still the relation which shows that the frequency excursion is the same for the "high"-channel as for the "low"-channel namely:

$$F_1 - F_2 = F'_1 - F'_2 \tag{5}$$

To construct a universal modulator which must supply the frequencies ($F_1$, $F_2$) and ($F'_1$, $F'_2$) satisfying the condition (5), it is, for example, possible to choose the value of the capacitance C, the resistance ratio ($R_5/R_4$) and the resistance $R_C$, and to determine thereafter the values of the resistances $R_1$, $R_2$, $R_3$ from the relations (3), (4) and (5).

For the modulator standardized by the CCITT for which:

| $F_1 = 1850$ Hz | $F_2 = 1650$ Hz |
| $F_1' = 1180$ Hz | $F_2' = 980$ Hz | one may choose, for example:
C = 2.7 nF $(R_5/R_4)=2$
$R_c=93.10$ K$\Omega$
and it can then be calculated that:
$R_1=9.150$ K$\Omega$
$R_2=129.5$ K$\Omega$
$R_3=38.65$ K$\Omega$.

In practice, when the various components of the circuit have the values determined by the calculation, with an accuracy of 1%, the only adjustment to be effected in the factory is the adjustment of a central frequency, for example the central frequency Fo of the "high"-channel by acting on one of the resistances of the ratio ($R_5/R_4$). This adjustment in the factory having been made, the desired frequencies for the "high"-channel or the "low"-channel will be obtained during use by simply acting on the change-over switch 14 or an equivalent means. When the circuit components have the values determined by the calculation with an accuracy of 1%, the adjustment to be made in the factory consists in the adjustment, in addition to the central frequency $F_0$ as mentioned above, of the frequency shift $F_1-F_2$ by acting on the resistance $R_2$ and, finally, the spacing $F_o-F'_o$ between the central frequencies of the "high" and the "low" channels by acting on the resistance $R_3$. During use a switch-over is made from the frequencies of the "high"-channel to those of the "low"-channel, as indicated above.

It is noted that using the resistor 16 of resistance value $R_c$ connected to the input of the operational amplifier 1 in the modulator of FIG. 1, renders it possible to reduce the resistance values $R_1$, $R_2$, $R_3$ of the resistors 7, 11 and 15. When, for example in the modulator standardized by CCITT, the resistor 16 is not used ($R_c=0$) and further $C=2.7$ nF and $(R_5/R_4)=2$, as above, the calculation for the resistors 7, 11 and 15 results in the resistance values $R_1=130.8$ K$\Omega$, $R_2=1851.5$ K$\Omega$, $R_3=552.7$ K$\Omega$. It is known that it is not advantageous, as regards the precision and the stability of the output voltage of an operational amplifier, to connect resistors having this comparatively high values to its input. In contrast therewith, the use of a resistor 16 of resistance value $R_c$ renders it possible to connect a resistor network having much lower resistance values, for example the values indicated above, to the input of this amplifier.

Finally, as mentioned hereinbefore, the stability of the frequency versus the temperature will be improved when the inverter 5 and the Exclusive-OR circuits 9 and 13 are implemented in CMOS technology. The variations versus the temperature of the output resistance of these circuits may substantially be neglected with respect to the above-mentioned values of the resistances $R_2$, $R_2$, $R_3$ connected to their outputs.

What is claimed is:

1. A modulator for data transmission by frequency shift modulation comprising a first operational amplifier and an associated capacitor connected so as to form an integrating circuit, a bistable circuit having trigger hysteresis connected to the output of the first operational amplifier for producing a two-level voltage, a first resistor having one end connected to the output of the bistable circuit and the other end coupled to an input of the first operational amplifier so as to produce a triangular voltage at the output of the first operational amplifier, first logic means for applying a voltage equal or complementary to said two-level voltage, depending upon the value of the data signal, to one end of a second resistor whose other end is joined with said other end of the first resistor, characterized in that for generating a first or a second frequency shift modulated signal having different central frequencies and being modulated with the same frequency shift the modulator comprises second logic means for applying a voltage equal or complementary to said two-level voltage, depending on whether the desired modulated signal is said first or said second frequency shift modulated signal, to one end of a third resistor whose other end is joined with the joined ends of the first and second resistors, and a common resistor connected between the joined ends of the first, second and third resistors and the input of the first operational amplifier.

2. A modulator as claimed in claim 1, characterized in that the bistable circuit with trigger hysteresis consists of a second operational amplifier followed by an inverter producing said two-level voltage and two resistors connected in series between the output of the first operational amplifier and the output of the inverter, one input of the second operational amplifier being connected to the junction of said two series connected resistors.

3. A modulator as claimed in claim 2, characterized in that all circuits used are fed with one sole voltage U and that the voltage applied to the other input of the first and second operational amplifiers is equal to U/2.

4. A modulator as claimed in any one of the claims 1, 2 and 3, characterized in that all circuits used are implemented in CMOS technology.

* * * * *

UNITED STATES PATENT AND TRADEMARK OFFICE
CERTIFICATE OF CORRECTION

PATENT NO. : 4,323,862
DATED : April 6, 1982
INVENTOR(S) : ROBERT BOUDAULT ET AL It is certified that error appears in the above—identified patent and that said Letters Patent is hereby corrected as shown below:

On the title page,
Please change the Assignee "U.S. Philips Corporation, New York, N.Y." to --Telecommunications Radioelectriques et Telephoniques T.R.T., Paris, France--.

Signed and Sealed this

Twenty-seventh Day of July 1982

[SEAL]

Attest:

Attesting Officer

GERALD J. MOSSINGHOFF

Commissioner of Patents and Trademarks